United States Patent
Hammer et al.

(10) Patent No.: US 11,220,296 B2
(45) Date of Patent: Jan. 11, 2022

(54) VEHICLE STRUCTURAL MEMBER FOR IMPROVED LATERAL LOADING

(71) Applicant: TOYOTA MOTOR ENGINEERING & MANUFACTURING NORTH AMERICA, INC., Plano, TX (US)

(72) Inventors: Jeremiah T. Hammer, Ann Arbor, MI (US); Brian L. Tew, Ann Arbor, MI (US); John P. Kim, Ann Arbor, MI (US); Mark Clauser, Saline, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 156 days.

(21) Appl. No.: 16/571,378

(22) Filed: Sep. 16, 2019

(65) Prior Publication Data
US 2021/0078637 A1    Mar. 18, 2021

(51) Int. Cl.
*B62D 21/15*    (2006.01)
*B62D 21/03*    (2006.01)
*B62D 27/02*    (2006.01)
*B62D 27/06*    (2006.01)

(52) U.S. Cl.
CPC .......... *B62D 21/155* (2013.01); *B62D 21/03* (2013.01); *B62D 27/02* (2013.01); *B62D 27/065* (2013.01)

(58) Field of Classification Search
CPC ...... B62D 21/155; B62D 27/06; B62D 27/02; B62D 21/03
USPC .................................................... 296/187.09
See application file for complete search history.

(56) References Cited

U.S. PATENT DOCUMENTS

| | | | |
|---|---|---|---|
| 8,668,252 B2 * | 3/2014 | Yasuhara | B62D 25/20 296/193.07 |
| 9,067,627 B2 | 6/2015 | Hara | |
| 9,567,010 B2 | 2/2017 | Volz et al. | |
| 9,645,660 B2 | 5/2017 | Vollmer | |
| 9,988,090 B2 | 6/2018 | Nishikawa | |
| 10,086,784 B2 | 10/2018 | Duffe | |
| 10,124,831 B2 | 11/2018 | Grattan et al. | |
| 2018/0065676 A1 * | 3/2018 | Yoshida | B62D 21/15 |
| 2018/0273098 A1 | 9/2018 | Komiya et al. | |

* cited by examiner

*Primary Examiner* — D Glenn Dayoan
*Assistant Examiner* — Dana D Ivey
(74) *Attorney, Agent, or Firm* — Haynes and Boone, LLP

(57) ABSTRACT

Disclosed is an apparatus for improving lateral crash pushing and distributing crash energy within a vehicle. The apparatus comprises a first frame cross member extending laterally between a left hand frame rail and a right hand frame rail of a vehicle, and a second frame cross member, aft of the first frame cross member, extending laterally between the left hand frame rail and the right hand frame rail. The apparatus further comprises an outrigger projecting outward laterally from the first frame cross member and an impact member selected from the left hand frame rail or right hand frame rail; and a connection arm projecting diagonally from a distal end of the outrigger to a connection point on the second frame cross member, beneath the impact member, such that when an impact force travels longitudinally into the outrigger, the impact force is distributed to both the first frame cross member through the outrigger and the second frame cross member through the connection arm.

20 Claims, 12 Drawing Sheets

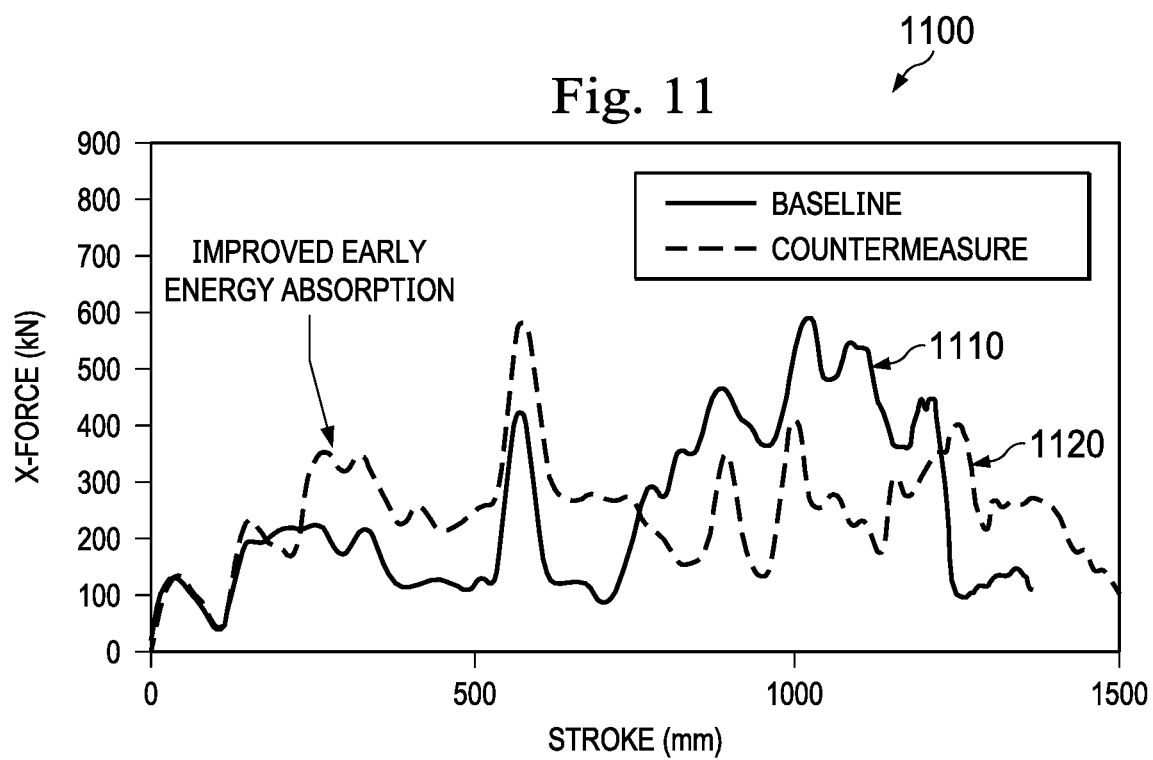
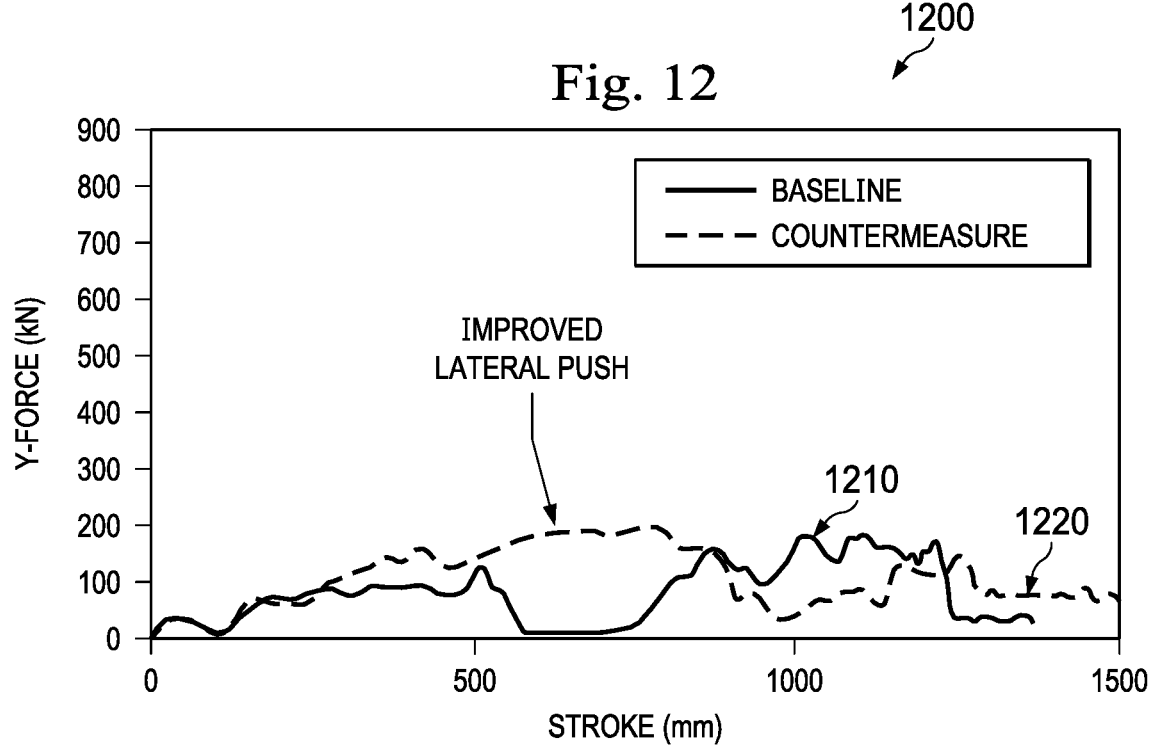

VEHICLE STRUCTURAL MEMBER FOR IMPROVED LATERAL LOADING

TECHNICAL FIELD

The subject matter described herein relates to a device, system, and method for improving motor vehicle safety during small overlap rigid barrier (SOL) frontal crashes. This device, system, and method have particular but not exclusive utility for automobiles and trucks.

BACKGROUND

Modern vehicles are designed with crash safety in mind. Crash safety is tested both physically (using actual crashes staged under laboratory conditions) and virtually (using computer models and numerical analysis) to determine the forces, accelerations, and deformations that a given vehicle design will experience in a given set of crash conditions. One particularly challenging scenario occurs during the frontal crash mode called small overlap rigid barrier (SOL), wherein a vehicle strikes a rigid barrier at ~25% overlap or less to the vehicle width. Due to this small overlap between the barrier and the vehicle, the main structural members of the vehicle frame are not directly contacted, and the deformation to the vehicle cabin can be severe. To avoid large deformations to the occupant area, it is advantageous to both engage these missed structural members and to push the vehicle away from the barrier. Engaging the structural members is beneficial, as it permits the structural members to absorb some of the energy of the crash outside of the occupant area. Pushing the vehicle off the barrier is beneficial because some of the energy is transferred to lateral kinetic energy which will not need to be absorbed by the vehicle. This motion is also beneficial because the vehicle can escape the barrier sooner, which may reduce direct contact between the vehicle cabin and the barrier. Therefore, some vehicles incorporate SOL pushers to help absorb and distribute energy during this type of collision.

However, present designs require heavy, complex structures that distribute forces laterally across the number one cross brace, which still leaves a quantity of energy to be absorbed by the vehicle body. Thus, currently used SOL pushers have numerous drawbacks, including excessive vehicle deceleration, excessive cabin deformation, and otherwise. Accordingly, a need exists for improved SOL pushers that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a SOL pusher block structure that includes a novel additional structural member that engages the strong structural members of the vehicle frame early in the collision event. The SOL pusher block structure disclosed herein has particular, but not exclusive, utility for collision mitigation in automobiles and light trucks. The SOL pusher block structure comprises a device including: a first frame cross member extending laterally between a left hand frame rail and a right hand frame rail of a vehicle; a second frame cross member, aft of the first frame cross member, extending laterally between the left hand frame rail and the right hand frame rail; an outrigger projecting outward laterally from the first frame cross member and an impact member selected from the left hand frame rail or right hand frame rail; and a connection arm projecting diagonally from a distal end of the outrigger to a connection point on the second frame cross member, beneath the impact member, such that when an impact force travels longitudinally into the outrigger, the impact force is distributed to both the first frame cross member through the outrigger and the second frame cross member through the connection arm.

Implementations may include one or more of the following features. The device where the outrigger is hollow. The device further including a crush-resistant element within the outrigger. The device where the outrigger is welded or bolted to the first frame cross member. The device where the connection arm is welded or bolted to the outrigger. The device where the connection arm is welded or bolted to the second frame cross member. The device where the first frame cross member is welded or bolted to the left hand frame rail and the right hand frame rail. The device where the second frame cross member is welded or bolted to the left hand frame rail and the right hand frame rail. The device where the outrigger is combined with at least one of the first frame cross member and the connection arm as a single fabricated piece. The device further including the vehicle.

One general aspect includes a method for improving lateral crash pushing and distributing a crash force within a vehicle, including: reinforcing a left hand frame rail and a right hand frame rail of the vehicle with a first frame cross member that extends laterally between the left hand frame rail and the right hand frame rail of the vehicle; further reinforcing the left hand frame rail and right hand frame rail with a second frame cross member, aft of the first frame cross member, that extends laterally between the left hand frame rail and the right hand frame rail; providing an outrigger projecting outward laterally from the first frame cross member and an impact member selected from the left hand frame rail or right hand frame rail; and connecting a distal end of the outrigger to a connection point on the second frame cross member, beneath the impact member, with a diagonally projecting connection arm, such that when the crash force travels longitudinally into the outrigger, the crash force is distributed to both the first frame cross member through the outrigger and the second frame cross member through the connection arm.

Implementations may include one or more of the following features. The method where the outrigger is hollow. The method further including providing a crush-resistant element within the outrigger. The method further including welding or bolting the outrigger to the first frame cross member. The method further including welding or bolting the connection arm to the outrigger. The method further including welding or bolting the connection arm to the second frame cross member. The method further including welding or bolting the first frame cross member to the left hand frame rail and the right hand frame rail. The method further including welding or bolting the second frame cross member to the left hand frame rail and the right hand frame rail. The method where the outrigger is combined with at least one of the first frame cross member and the connection arm as a single fabricated piece.

One general aspect includes a system for improving lateral crash pushing and distributing crash energy within a vehicle, including: the vehicle, a first frame cross member extending laterally between a left hand frame rail and a right hand frame rail of the vehicle, a second frame cross member, aft of the first frame cross member, extending laterally between the left hand frame rail and the right hand frame rail, a hollow outrigger projecting outward laterally from the first frame cross member and an impact member selected from the left hand frame rail or right hand frame rail. The system also includes a crush-resistant element within the hollow outrigger selected from an i-beam, a truss, or a bulkhead. The system also includes a connection arm projecting diagonally from a distal end of the hollow outrigger to a connection point on the second frame cross member, beneath the impact member.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the SOL pusher block structure, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 11 is a graph showing the longitudinal (X) force experienced in an example SOL collision by an example vehicle with and without the novel SOL pusher block structure, in accordance with at least one embodiment of the present disclosure.

FIG. 12 is a graph showing the lateral (Y) force experienced in an example SOL collision by an example vehicle with and without the novel SOL pusher block structure, in accordance with at least one embodiment of the present disclosure.

DETAILED DESCRIPTION

Figure 1:
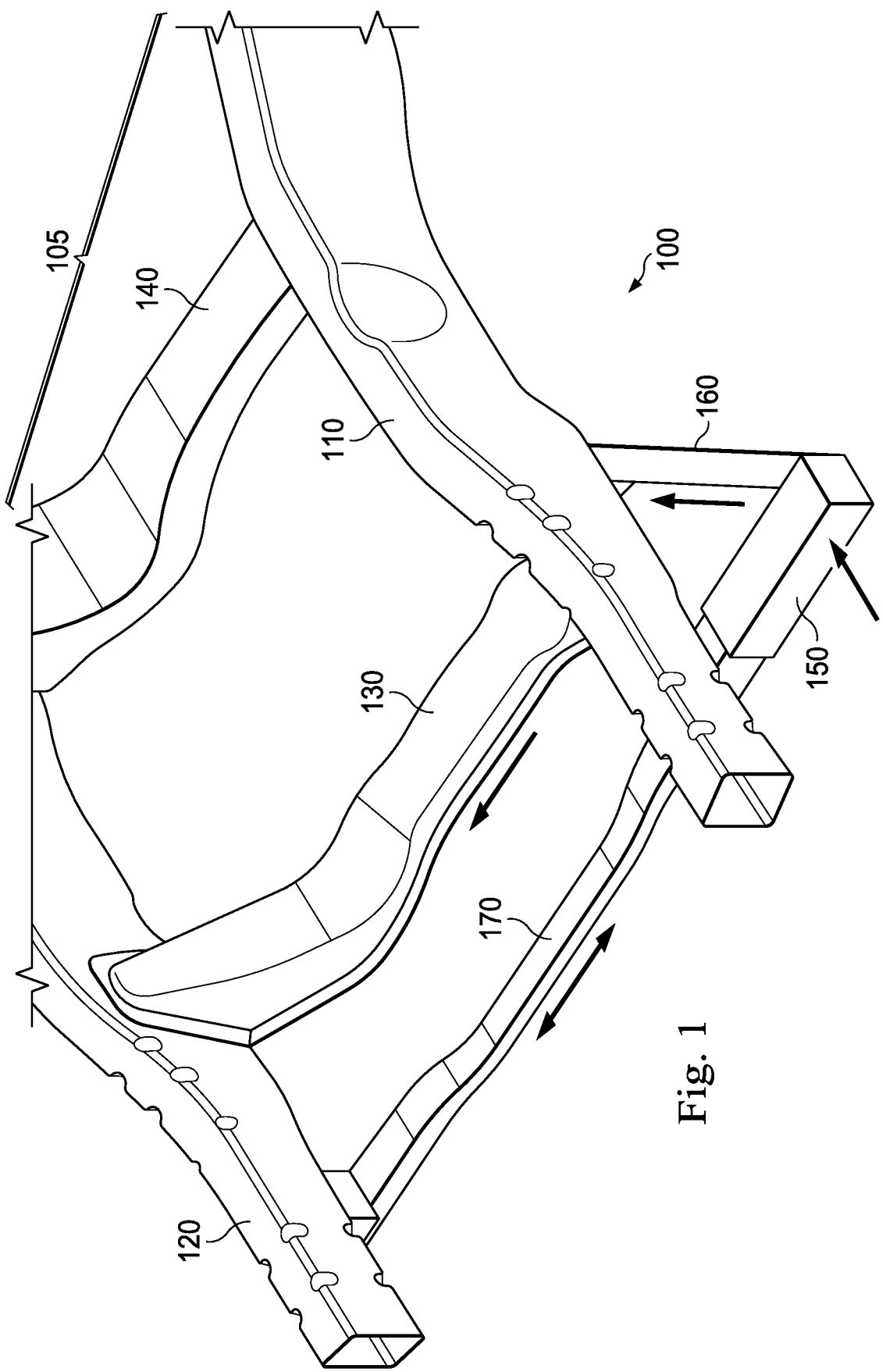
FIG. 1 is a perspective view of an example SOL pusher block structure in accordance with at least one embodiment of the present disclosure.

In accordance with at least one embodiment of the present disclosure, a SOL pusher block structure is provided which includes a novel additional structural member that engages the strong structural members of the vehicle frame early in the collision event. The component also redirects some of the applied barrier force to assist in pushing the vehicle off the barrier earlier than would otherwise occur without the novel structural member. These descriptions are provided for exemplary purposes only, and should not be considered to limit the scope of the SOL pusher block structure. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a perspective view of an example SOL pusher block structure 100 in accordance with at least one embodiment of the present disclosure. The present disclosure adds several improvements to the current technology. The SOL pusher 100 of the present disclosure mounts to vehicle frame 105, including attachment points on the left-hand frame rail 110, the right-hand frame rail 120, and the No. 1 frame cross member 130. The vehicle frame 105 also includes a No. 2 frame cross member 140 which may not be directly involved in dissipating energy from SOL collisions. The SOL pusher block structure 100 of the present disclosure includes, on both the left and right sides of the vehicle frame 105, an outrigger 150 projecting laterally from the frame 105, and an angled structural member or connection arm 160 that diagonally connects a distal end of the outrigger 150 to a connection point on the No. 1 cross frame member 130.

As compared with other SOL pushers in the related art, the SOL pusher block structure 100 is mounted lower on the frame 105, from a No. 0 cross brace 170, and is also mounted directly to the No. 1 frame cross member 130. This connection allows for a more direct force transfer to the No. 1 frame cross member 130, and eliminates the need for a frame bulkhead, which may reduce both the cost and complexity of the total structure. Thus, the No. 0 frame cross member 170 may be referred to as a "first frame cross member", and the No. 1 frame cross member 130 may be referred to as a "second frame cross member", as shown in FIG. 1.

Before continuing, it should be noted that the examples described above are provided for purposes of illustration, and are not intended to be limiting. Other devices and/or device configurations may be utilized to carry out the operations described herein.

Figure 2:
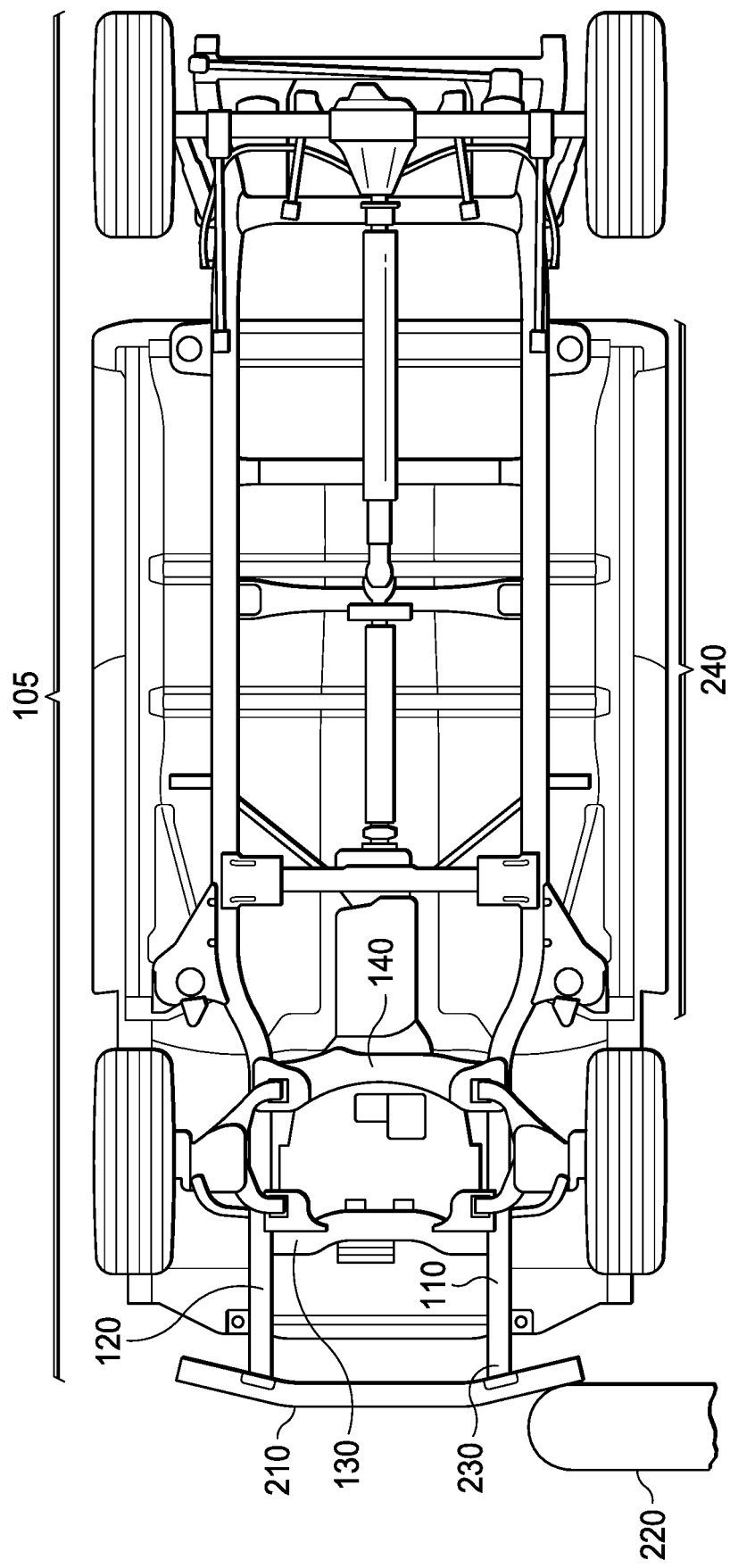
FIG. 2 is a bottom view of a vehicle frame from the related art.

FIG. 2 is a bottom view of a vehicle frame 105 from the related art. Visible are the left-hand frame rail 110, right hand frame rail 120, No. 1 frame cross member 130, and No. 2 frame cross member 140. The vehicle frame also includes a bumper 210, and supports a cabin or vehicle occupant area 240. Protecting the vehicle occupant area 240 from excessive deceleration or intrusion during an SOL collision is a goal of the present disclosure. When the left edge of the bumper 210 is struck by an SOL barrier 220, the bumper 210 is likely to shear off, and the left frame rail 110 serves as the main structural member or impact member 230 to absorb the energy of the SOL collision, which limits the ability of the vehicle frame 105 to distribute and dissipate the crash energy. If the barrier 220 misses the frame rail 110 entirely, then it is the body rather than the frame of the vehicle that must absorb the crash energy, and deformation to the cabin 240 may be particularly severe.

Figure 3:
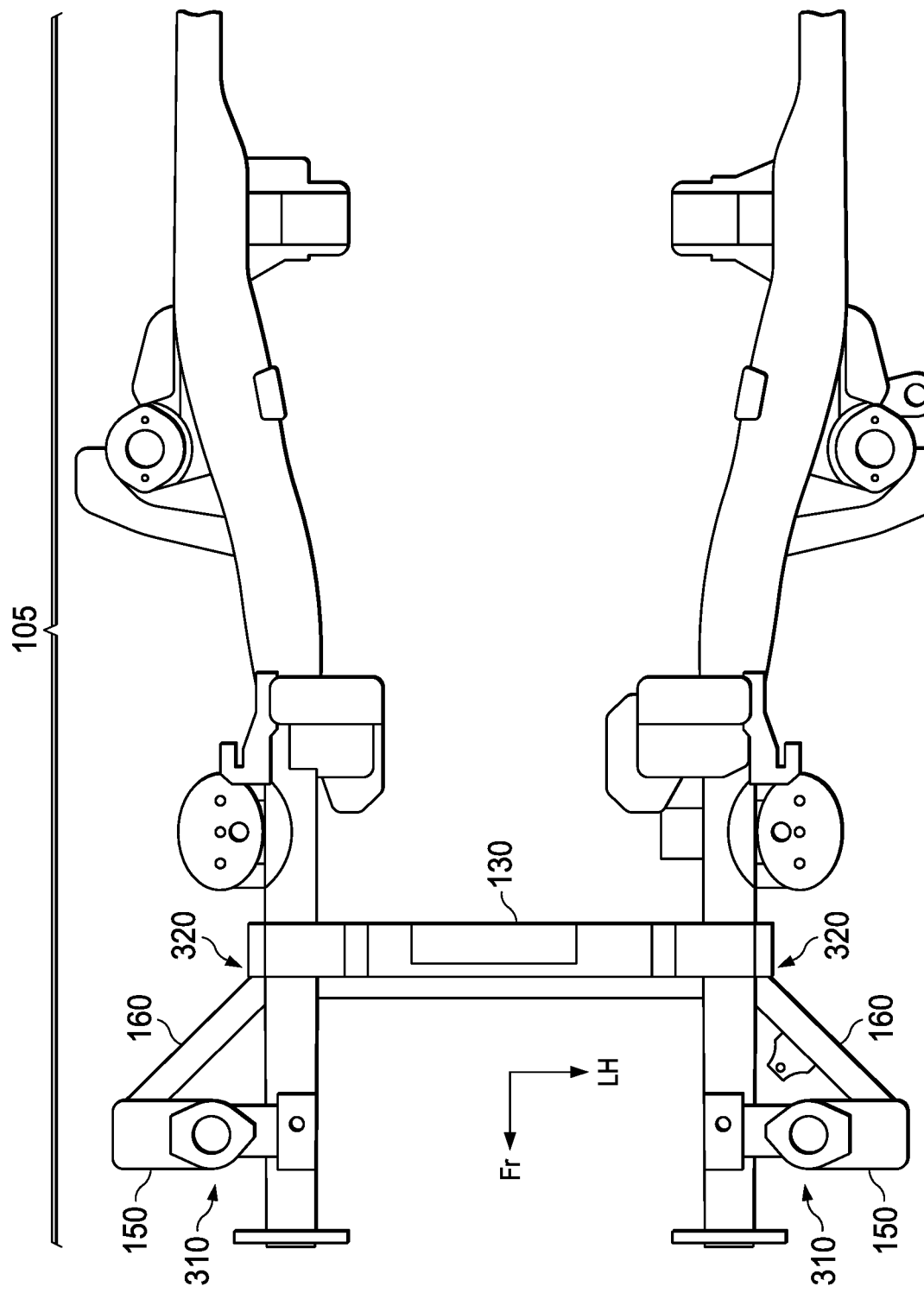
FIG. 3 is a bottom view of an SOL pusher from the related art.

FIG. 3 is a bottom view of an SOL pusher from the related art. The SOL pusher design shown here is currently employed by General Motors, and includes a small outrigger 150 on the left and right sides of the frame 105 projecting from the front cabin mounts 310, and an angled structural member 160 connecting the outrigger 150 to the No. 1 frame cross member by a frame bulkhead 320. This arrangement has a number of drawbacks, as will be shown below.

Figure 4:
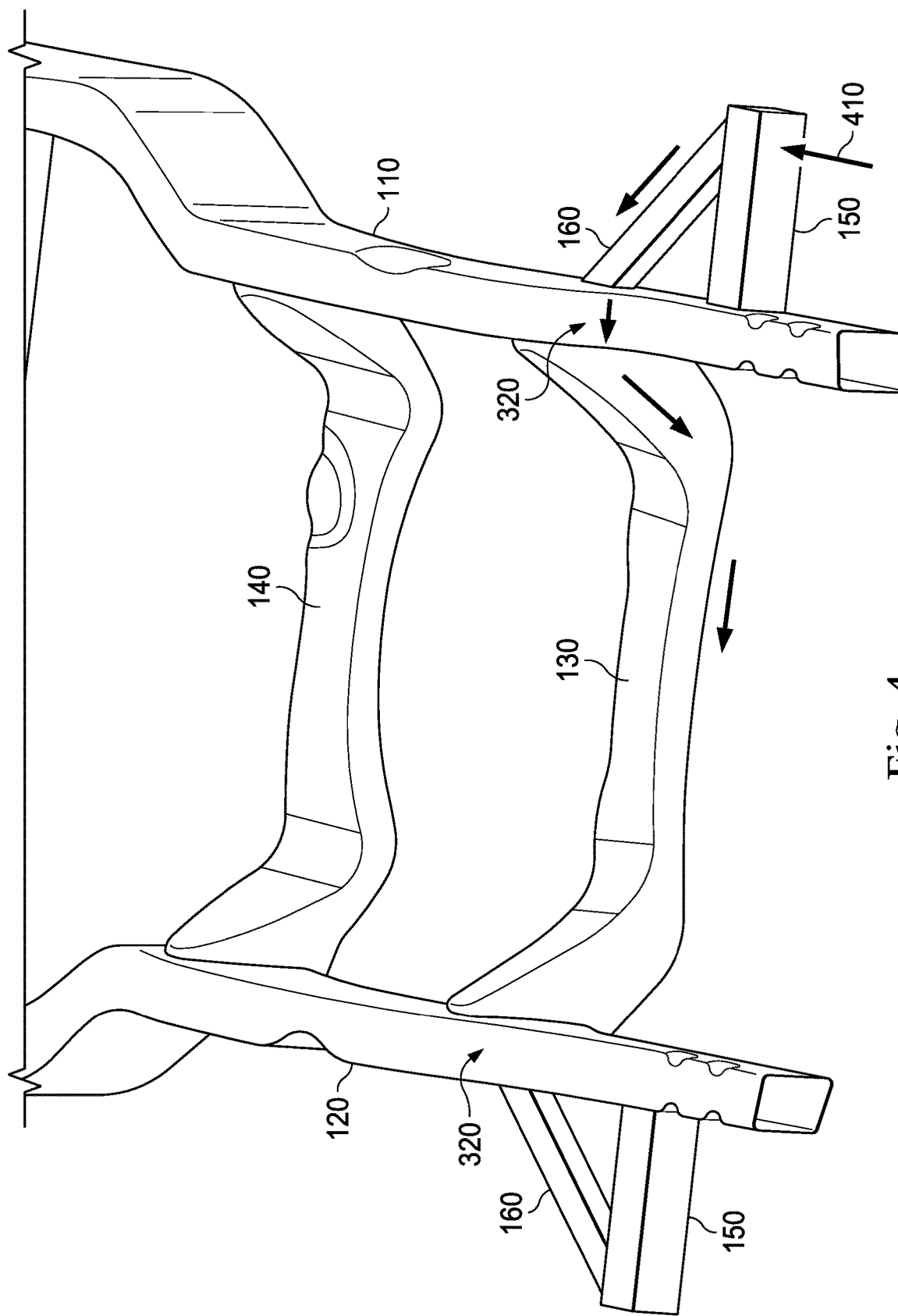
FIG. 4 is a perspective view of an SOL pusher from the related art.

FIG. 4 is a perspective view of an SOL pusher from the related art. During an SOL crash on the left side of the vehicle, the main loading 410 from the barrier 220 strikes the left outrigger 150, and travels through the angled structural member 160 both of which attach to the cabin mounts 310. The angled structural member 160 indirectly pushes on the No. 1 frame cross member 130 through a complex and costly bulkhead 320 inside the left frame rail 110. The mirror image structure, including an outrigger 150, angled structural member 160, and bulkhead 320, exists on the right side of the frame 105. After pushing through this bulkhead 320, the force must travel downward through the angled portion of the No. 1 frame cross member 130 to the horizontal portion of the No. 1 frame cross member 130 where the force can finally be transferred, redirected, absorbed, or dissipated. The indirect path traveled by the SOL collision force includes four changes of direction and yet ends up primarily in a single structural member, the No. 1 frame cross member 130. Furthermore, the loading occurs high up on the No. 1 frame cross member 130, which means more bending of, and therefore less pushing by, the frame cross member 130. This prolongs the duration of the SOL collision event, prolongs contact between the barrier 220 and the vehicle frame 105, and limits the ability of the vehicle frame 105 to transfer, redirect, absorb, or dissipate the SOL collision energy. As a result, decelerations of and intrusions into the passenger cabin 240 may be excessive (e.g., unsafe for vehicle occupants) even during fairly low-speed SOL collisions.

Figure 5:
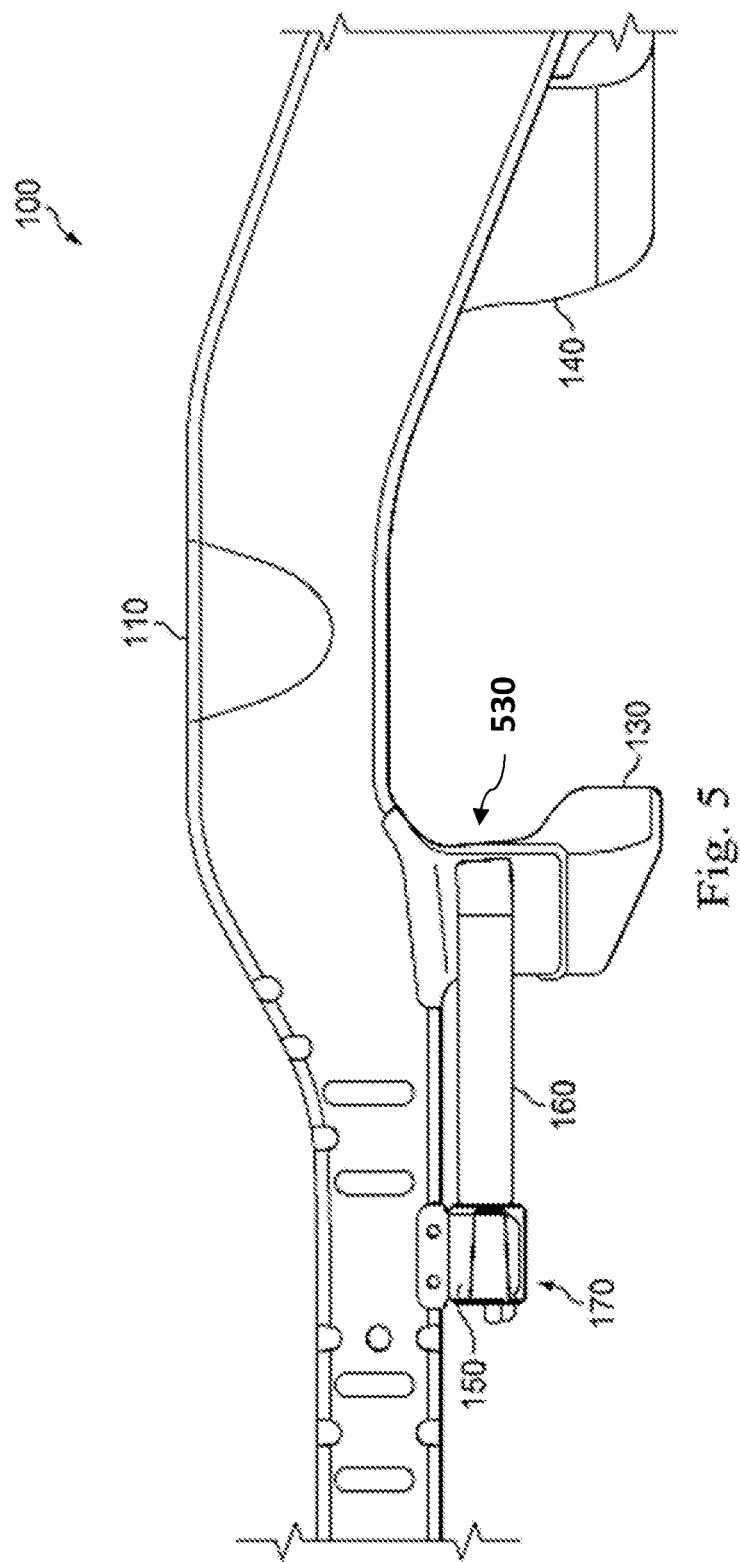
FIG. 5 is a side view of an example SOL pusher block structure in accordance with at least one embodiment of the present disclosure.

FIG. 5 is a side view of an example SOL pusher block structure 100 in accordance with at least one embodiment of the present disclosure. As seen in FIG. 1, the SOL pusher block structure 100 includes an outrigger 150 attached to the left hand frame rail 110 and an angled structural member or connection arm 160 attached to the outrigger 150 and the No. 1 frame cross member 130 (e.g., at a connection point 530). However, an additional load path is added with the No. 0 frame cross member 170, which will absorb or redirect additional energy during the early portion of the SOL crash event, thus reducing the overall duration and severity of the crash, as will be shown in detail below. Further, the connection to the No. 1 frame cross member 130 is now at a lower point, providing for more direct loading of, less bending of, and more pushing by the No. 1 frame cross member 130. In some embodiments, the angled structural member or connection arm 160 may also angle downward, so that it connects with the No. 1 frame cross member 130 at an even lower point, for even more direct loading.

Figure 6:
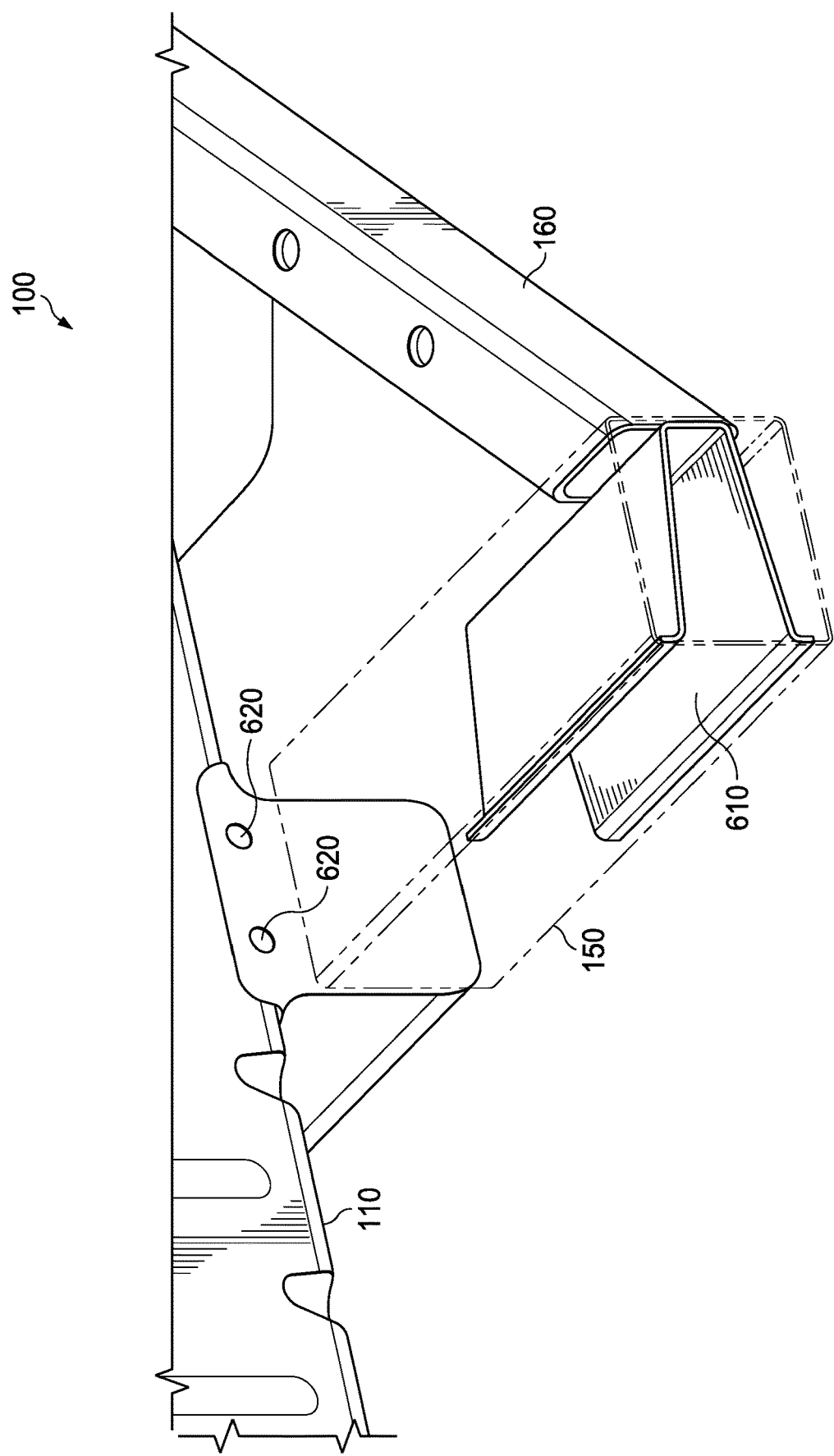
FIG. 6 is a perspective view of an example SOL pusher block structure in accordance with at least one embodiment of the present disclosure.

FIG. 6 is a perspective view of an example SOL pusher block structure 100 in accordance with at least one embodiment of the present disclosure. In some embodiments, the outrigger 150 of the present disclosure is hollow, to save weight vs. a solid outrigger, but its structure includes a crush-resistant internal part or element 610 to reduce crush during the impact event, thus permitting the pusher block structure 100 to more efficiently transfer energy away from the impact site. The crush-resistant internal part or element 610 may comprise a bulkhead, truss, I-beam, or other related load-bearing structure, and may be attached to the interior of the outrigger 150 by welds, bolts, screws, etc., or may be manufactured (e.g., forged, cast, extruded, 3D printed, etc.) as part of the outrigger 150. Similarly, the angled structural member 160 may be welded, bolted, or otherwise affixed to the outrigger 150, but in some embodiments the outrigger 150 and angled structural member 160 are formed as a single fabricated piece. In this example, the outrigger is attached to the left-hand frame rail 110 with bolts 620.

As a design tradeoff, the crush-resistant internal part or element 610 may be rigid to improve pushing, may be partially crushable to improve energy absorption, or any combination thereof.

The mirror-image structure, including outrigger 150, crush-resistant internal part 610, angled structural member 160, and bolts 620, can be found on the right-hand side of the frame 105 (e.g., attached to the right-hand frame rail 120).

Figure 7:
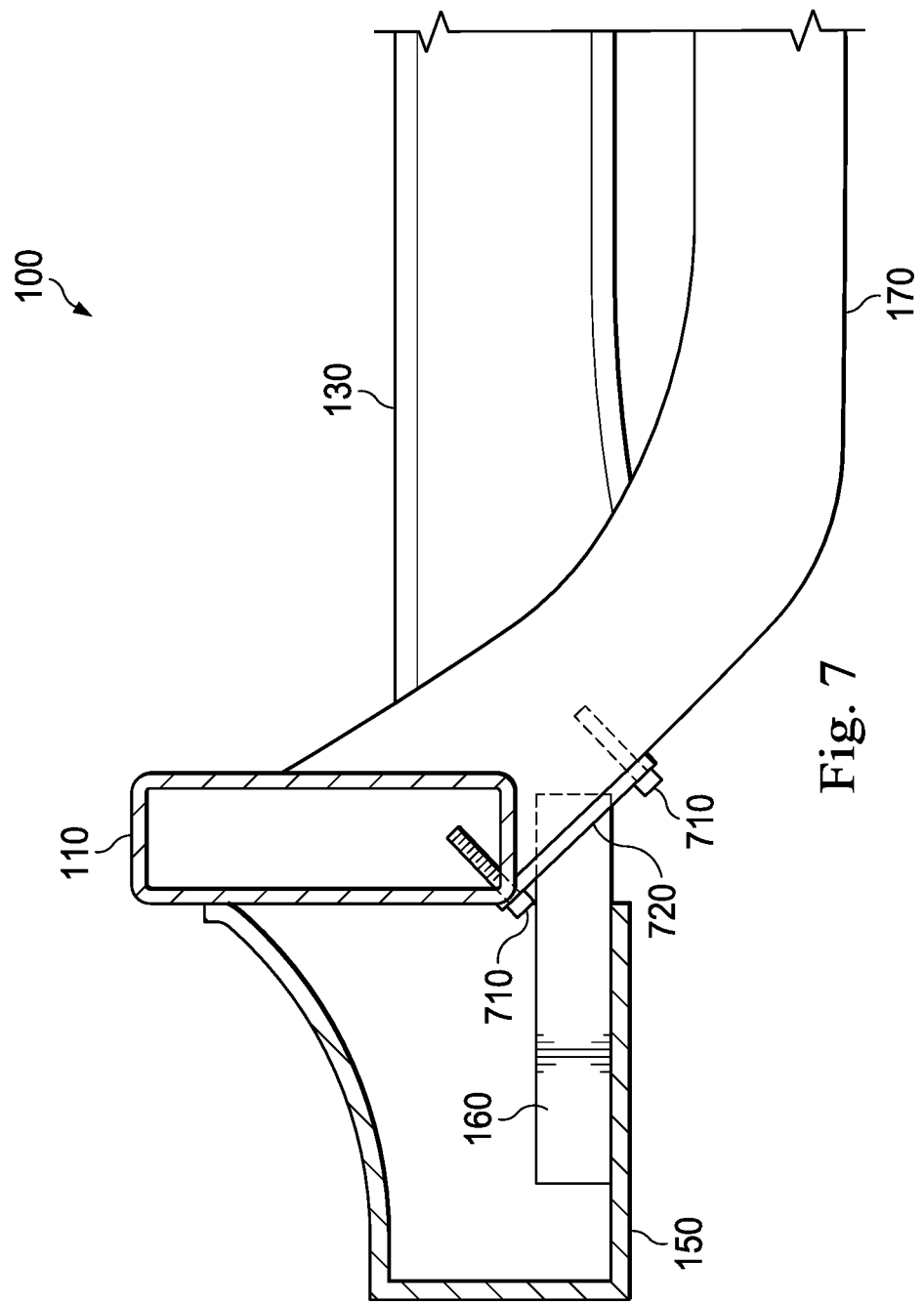
FIG. 7 is a front view of an example SOL pusher block structure in accordance with at least one embodiment of the present disclosure.

FIG. 7 is a rear view of an example SOL pusher block structure 100 in accordance with at least one embodiment of the present disclosure. In this example, the angled structural member or connection arm 160 is attached to the No. 1 frame cross member, below the left hand frame rail 110, with one or more angled bolts 710 and a plate 720.

Figure 8:
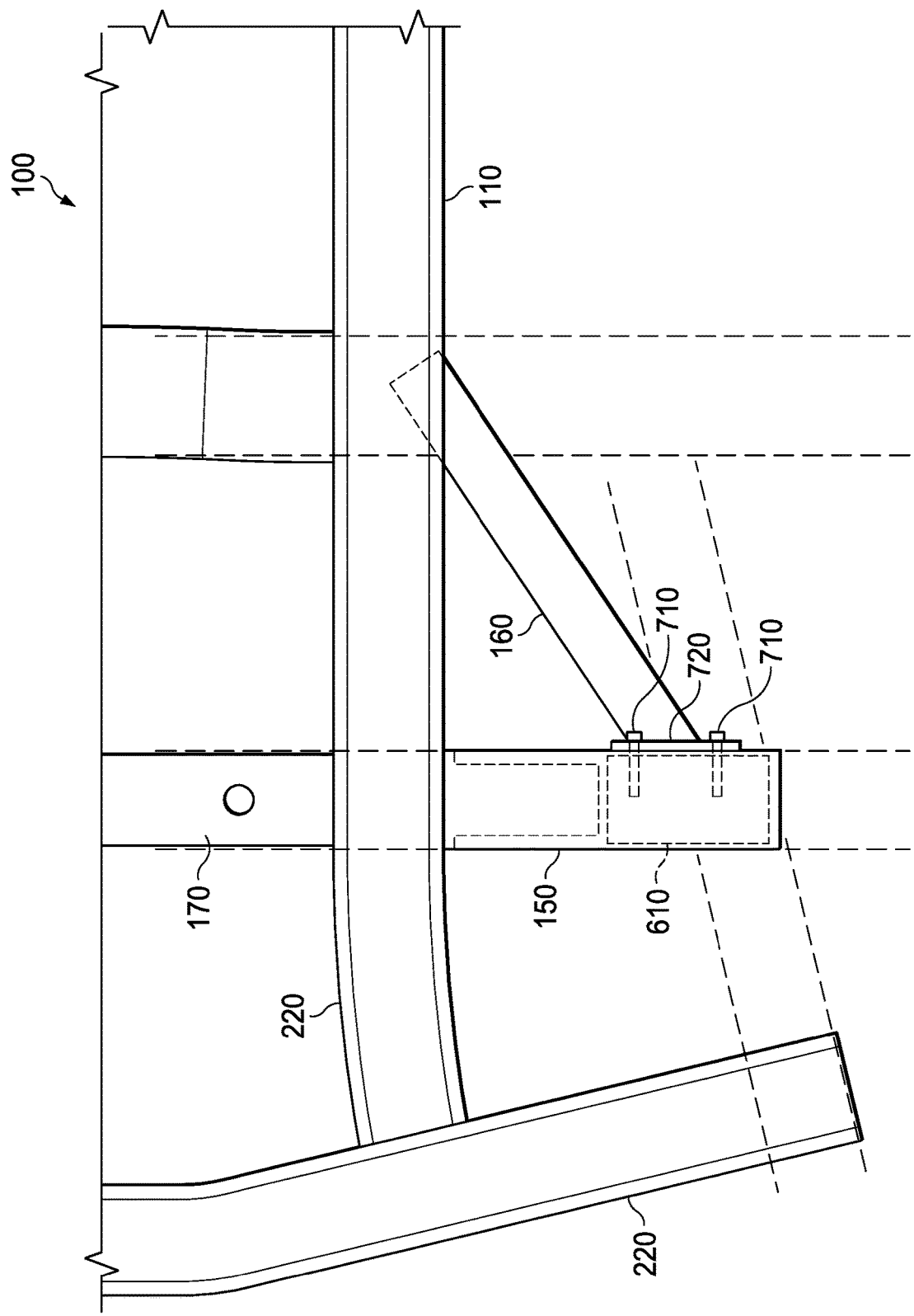
FIG. 8 is a top view of an example SOL pusher block structure in accordance with at least one embodiment of the present disclosure.

FIG. 8 is a top view of an example SOL pusher block structure 100 in accordance with at least one embodiment of the present disclosure. In this example, the angled structural member or connection arm 160 is attached to the outrigger 150 with bolts 710.

Figure 9:
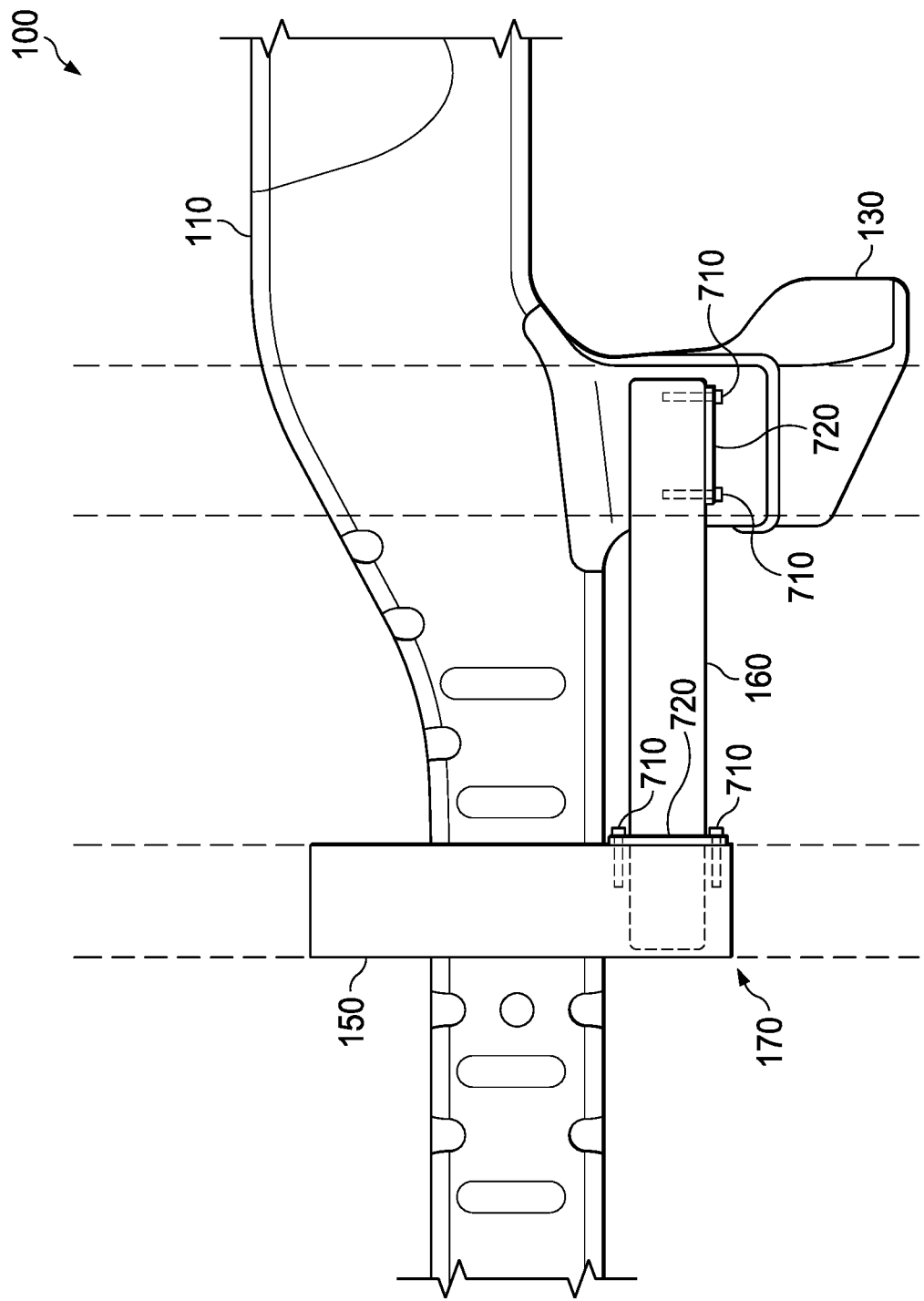
FIG. 9 is a side view of an example SOL pusher block structure in accordance with at least one embodiment of the present disclosure.

FIG. 9 is a side view of an example SOL pusher block structure 100 in accordance with at least one embodiment of the present disclosure. In this example, the angled structural member or connection arm 160 is attached to the outrigger 150 and No. 1 frame cross member 130 with bolts 710 and plates 720.

Figure 10:
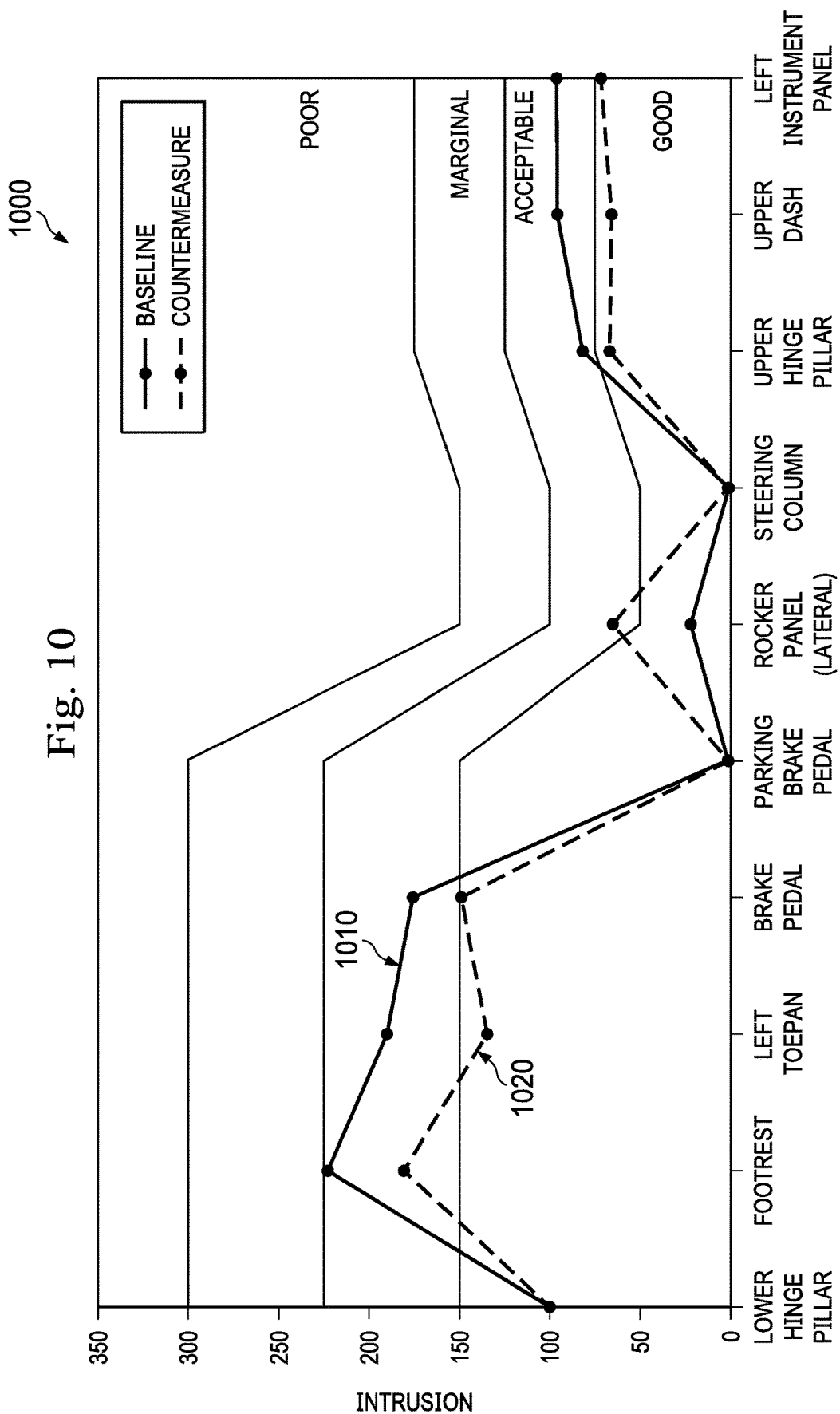
FIG. 10 is a chart showing maximum cabin intrusion (measured in millimeters) of different vehicle components during an example SOL collision, in accordance with at least one embodiment of the present disclosure.

FIG. 10 is a chart 1000 showing maximum cabin intrusion (measured in millimeters) of different vehicle components during an example SOL collision, in accordance with at least one embodiment of the present disclosure. In a vehicle equipped with the disclosed SOL pusher block 100 ("countermeasure"), vehicle crash performance 1020 is improved vs. crash performance 1010 for vehicles with the existing SOL pusher design ("baseline"). The countermeasure vehicle moves away from the barrier earlier in the SOL impact event, and the total required energy absorption by the vehicle is reduced. In an example collision, intrusion into the cabin 240 is reduced for the footrest, left toepan, brake pedal, parking brake pedal, upper hinge pillar, upper dashboard, and left instrument panel, and falls within "good" or "acceptable" levels (i.e., levels associated with reduced risk of serious injury to vehicle occupants). In this example, intrusion is essentially unchanged for the lower hinge pillar, parking brake pedal, and steering column, and is slightly worse for lateral (Y) intrusion of the rocker panel. This overall reduction in cabin intrusion reduces the risk of injury to properly restrained vehicle occupants.

FIG. 11 is a graph 1100 showing the longitudinal (X) force experienced in an example SOL collision by an example vehicle with and without the novel SOL pusher block structure 100, as a function of "stroke" or movement in millimeters, in accordance with at least one embodiment of the present disclosure. Stroke is a measure of movement that includes linear translation (prior to the collision), crushing (during the collision), and rotation (following the push away from the barrier 220 by the SOL pusher block structure 100). The baseline curve 1110 represents the X force experienced by the barrier 220 as it is collided with by a vehicle that incorporates an existing SOL pusher, whereas the countermeasure curve 1120 represents the X force experienced by the barrier 220 during the same collision with a vehicle incorporating the SOL pusher block structure 100 of the present disclosure. In the countermeasure curve 1120, improved early energy absorption in the longitudinal direction reduces the severity of the crash. For example, the peak force experienced by the vehicle is slightly lower, and the total stroke experienced by the vehicle is slightly greater, indicating energy absorption/dissipation over a larger distance and thus a longer time. The integral of curve 1120 (e.g., the area under the curve) may also be numerically similar to the integral of curve 1110, indicating similar overall energy dissipation, though distributed differently in time and space. The curves illustrate that the countermeasure curve 1120 advantageously dissipates this energy less impulsively (e.g., a flatter curve overall) than the baseline curve 1110.

Stroke early in a collision event corresponds closely with crushing and energy absorption, whereas stroke later in a collision event corresponds with deceleration of vehicle occupants within the vehicle cabin 240. It is therefore highly desirable for the vehicle to experience more stroke early in a collision event, and less stroke later in the collision event, and to push off from the barrier 220 as early in the event as possible (e.g., before the passenger cabin 240 has translated far enough forward to contact the barrier). During the first 800 mm of stroke, stroke is highly indicative of energy absorption. The situation is less clear for stroke after 800 mm, as motion in Y (e.g., from lateral pushing by the SOL pusher block structure 100) is not taken into account.

FIG. 12 is a graph 1200 showing the lateral (Y) force experienced in an example SOL collision by an example vehicle with and without the novel SOL pusher block structure 100, as a function of "stroke" or movement in millimeters, in accordance with at least one embodiment of the present disclosure. The baseline curve 1210 represents the Y force experienced by a vehicle that incorporates an existing SOL pusher, whereas the countermeasure curve 1220 represents the Y force experienced by a vehicle incorporating the SOL pusher block structure 100 of the present disclosure. In the countermeasure curve 1120, increased lateral pushing reduces the total contact time between the vehicle and the barrier. The integral of curve 1220 (e.g., the area under the curve) may be somewhat larger than the integral of curve 1210, indicating improved overall lateral pushing as well as improved early lateral pushing. This result is consistent with and indicative of reduced cabin deceleration, reduced cabin intrusion, and reduced likelihood of injury to properly restrained passengers.

Figure 13:
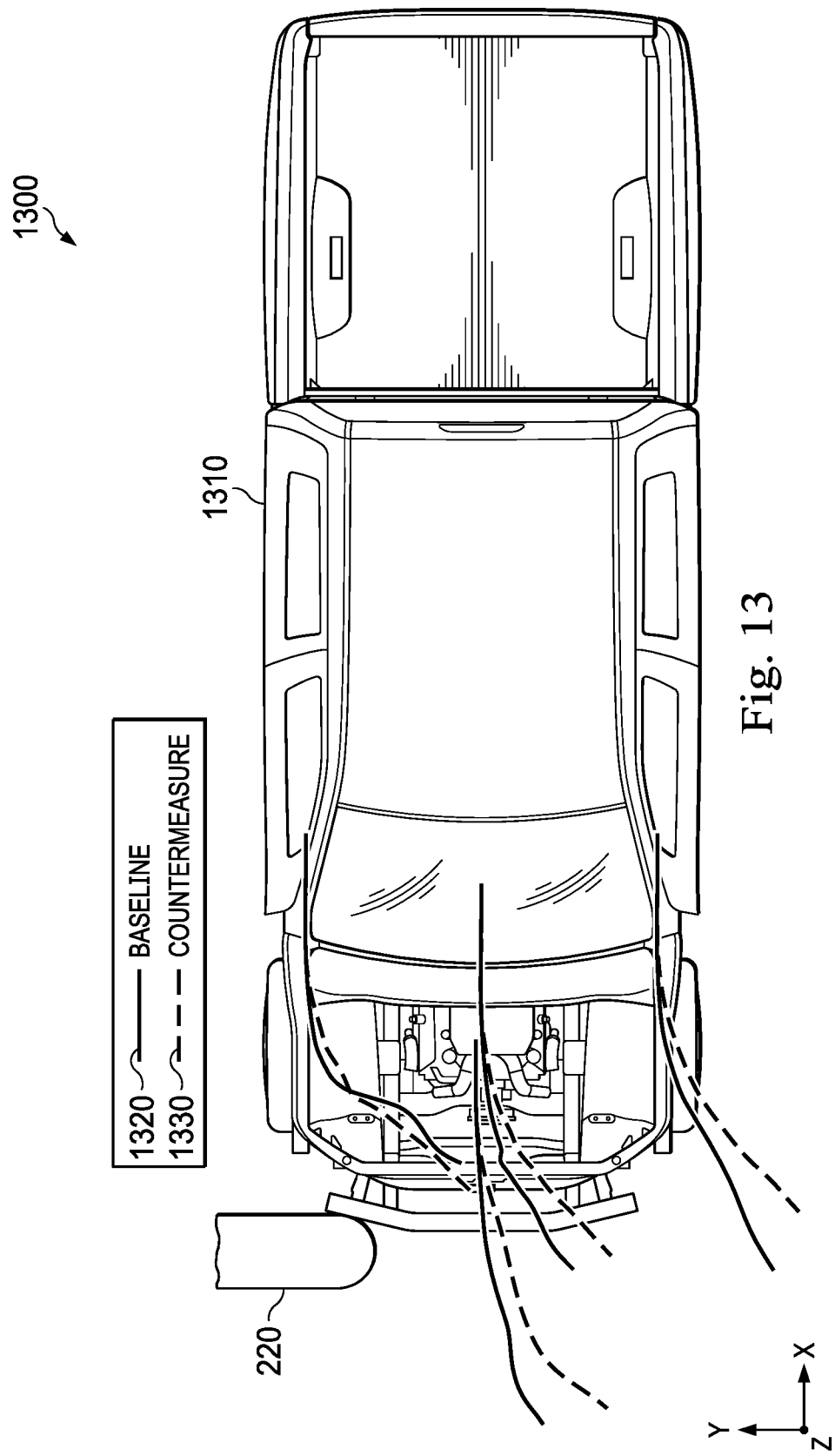
FIG. 13 is a graph of X-Y motion during an SOL collision between a vehicle and a barrier for a baseline case with a traditional SOL pusher and a countermeasure case with an SOL pusher block structure in accordance with at least one embodiment of the present disclosure.

FIG. 13 is a graph 1300 of X-Y motion during an SOL collision between a vehicle 1310 and a barrier 220 for a baseline case 1320 with a traditional SOL pusher and a countermeasure case 1330 with an SOL pusher block structure 100 in accordance with at least one embodiment of the present disclosure. The countermeasure case shows a similar level of motion in the parts of the vehicle 1310 that initially contact the barrier 220, but shows substantially more lateral acceleration of the vehicle away from the barrier than the baseline case 1320, accelerating earlier and faster to the left, and ending with greater total displacement in the Y direction. This result is consistent with and indicative of reduced longitudinal cabin deceleration, reduced cabin intrusion, and reduced likelihood of injury to properly restrained passengers, as the vehicle 1310 simply spends less time in contact with, and being decelerated and deformed by, the barrier 220.

Accordingly, it can be seen that the SOL pusher block structure offers substantial improvement over the related art, by improving passenger safety in the challenging frontal crash mode called small overlap rigid barrier (SOL), wherein a vehicle strikes a rigid barrier at ~25% overlap or less to the vehicle width. The SOL pusher block structure reduces peak forces and deceleration, and reduces the total deformation to the vehicle cabin.

Based on design considerations, the SOL pusher block structure may be made from a variety of different materials, including but not limited to metals, composites, and ceramics. Further, a number of variations are possible on the examples and embodiments described above. For example, the components could be longer, shorter, wider, thicker or of different cross-sectional shape than depicted herein, and may be oriented or angled in alternative manners that serve the same purpose of distributing SOL impact force through a No. 0 frame cross member as well as the No. 1 frame cross member. The technology described herein may be employed in automobiles and light trucks of diverse type and design, regardless of their underlying propulsion technologies.

Accordingly, the logical operations making up the embodiments of the technology described herein are referred to variously as operations, steps, objects, elements, components, or modules. Furthermore, it should be understood that these may occur in any order, unless explicitly claimed otherwise or a specific order is inherently necessitated by the claim language.

In some implementations, the components are bolted together to reduce cost. In other embodiments, multiple parts are welded together or co-formed as single parts. It should further be understood that the described technology may be employed in other vehicle types, whether motorized or not, including but not limited to RVs, trailers, mobile homes, vans, and food trucks.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the SOL pusher block structure. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the SOL pusher block structure as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A device comprising:
   a first frame cross member extending laterally between a left hand frame rail and a right hand frame rail of a vehicle;
   a second frame cross member, aft of the first frame cross member, extending laterally between the left hand frame rail and the right hand frame rail;
   an outrigger projecting outward laterally from the first frame cross member and an impact member selected from the left hand frame rail or right hand frame rail; and
   a connection arm projecting diagonally from a distal end of the outrigger to a connection point on the second frame cross member, beneath the impact member,
   such that when an impact force travels longitudinally into the outrigger, the impact force is distributed to both the first frame cross member through the outrigger and the second frame cross member through the connection arm.

2. The device of claim 1, wherein the outrigger is hollow.

3. The device of claim 2, further comprising a crush-resistant element within the outrigger.

4. The device of claim 1, wherein the outrigger is welded or bolted to the first frame cross member.

5. The device of claim 1, wherein the connection arm is welded or bolted to the outrigger.

6. The device of claim 1 wherein the connection arm is welded or bolted to the second frame cross member.

7. The device of claim 1, wherein the first frame cross member is welded or bolted to the left hand frame rail and the right hand frame rail.

8. The device of claim 1, wherein the second frame cross member is welded or bolted to the left hand frame rail and the right hand frame rail.

9. The device of claim 1, wherein the outrigger is combined with at least one of the first frame cross member and the connection arm as a single fabricated piece.

10. The device of claim 1, further comprising the vehicle.

11. A method for improving lateral crash pushing and distributing a crash force within a vehicle, comprising:
    reinforcing a left hand frame rail and a right hand frame rail of the vehicle with a first frame cross member that extends laterally between the left hand frame rail and the right hand frame rail of the vehicle;
    further reinforcing the left hand frame rail and right hand frame rail with a second frame cross member, aft of the first frame cross member, that extends laterally between the left hand frame rail and the right hand frame rail;
    providing an outrigger projecting outward laterally from the first frame cross member and an impact member selected from the left hand frame rail or right hand frame rail; and
    connecting a distal end of the outrigger to a connection point on the second frame cross member, beneath the impact member, with a diagonally projecting connection arm,
    such that when the crash force travels longitudinally into the outrigger, the crash force is distributed to both the first frame cross member through the outrigger and the second frame cross member through the connection arm.

12. The method of claim 11, wherein the outrigger is hollow.

13. The method of claim 12, further comprising providing a crush-resistant element within the outrigger.

14. The method of claim 11, further comprising welding or bolting the outrigger to the first frame cross member.

15. The method of claim 11, further comprising welding or bolting the connection arm to the outrigger.

16. The method of claim 11 further comprising welding or bolting the connection arm to the second frame cross member.

17. The method of claim 11, further comprising welding or bolting the first frame cross member to the left hand frame rail and the right hand frame rail.

18. The method of claim 11, further comprising welding or bolting the second frame cross member to the left hand frame rail and the right hand frame rail.

19. The method of claim 11, wherein the outrigger is combined with at least one of the first frame cross member and the connection arm as a single fabricated piece.

20. A system for improving lateral crash pushing and distributing crash energy within a vehicle, comprising:
    the vehicle;
    a first frame cross member extending laterally between a left hand frame rail and a right hand frame rail of the vehicle;
    a second frame cross member, aft of the first frame cross member, extending laterally between the left hand frame rail and the right hand frame rail;
    a hollow outrigger projecting outward laterally from the first frame cross member and an impact member selected from the left hand frame rail or right hand frame rail;
    a crush-resistant element within the hollow outrigger selected from an I-beam, a truss, or a bulkhead; and
    a connection arm projecting diagonally from a distal end of the hollow outrigger to a connection point on the second frame cross member, beneath the impact member.

* * * * *